US007937755B1

(12) United States Patent
Guruswamy (10) Patent No.: US 7,937,755 B1
(45) Date of Patent: May 3, 2011

(54) IDENTIFICATION OF NETWORK POLICY VIOLATIONS (75) Inventor: Kowsik Guruswamy, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1103 days.

(21) Appl. No.: 11/044,332

(22) Filed: Jan. 27, 2005

(51) Int. Cl.
*G06F 11/00* (2006.01)
*G06F 15/173* (2006.01)

(52) U.S. Cl. ............... 726/22; 726/23; 726/24; 726/25; 709/223; 709/224; 709/225

(58) Field of Classification Search .............. 726/22–25; 709/223–225; 370/229–231, 235
See application file for complete search history.

(56) References Cited

U.S. PATENT DOCUMENTS

| | | | |
|---|---|---|---|
| 5,787,253 A | 7/1998 | McCreery et al. | |
| 6,154,775 A * | 11/2000 | Coss et al. | 709/225 |
| 6,219,786 B1 * | 4/2001 | Cunningham et al. | 713/152 |
| 6,301,668 B1 | 10/2001 | Gleichauf et al. | |
| 6,499,107 B1 | 12/2002 | Gleichauf et al. | |
| 6,507,834 B1 | 1/2003 | Kabra et al. | |
| 6,751,728 B1 | 6/2004 | Gunter et al. | |
| 6,772,345 B1 | 8/2004 | Shetty | |
| 6,789,116 B1 | 9/2004 | Sarkissian et al. | |
| 6,845,452 B1 * | 1/2005 | Roddy et al. | 726/11 |
| 6,918,034 B1 | 7/2005 | Sengodan et al. | |
| 6,954,775 B1 | 10/2005 | Shanklin et al. | |
| 7,007,301 B2 | 2/2006 | Crosbie et al. | |
| 7,016,980 B1 * | 3/2006 | Mayer et al. | 709/249 |
| 7,065,657 B1 | 6/2006 | Moran | |
| 7,076,803 B2 | 7/2006 | Bruton, III et al. | |
| 7,089,428 B2 | 8/2006 | Farley et al. | |
| 7,100,201 B2 | 8/2006 | Izatt | |
| 7,174,566 B2 | 2/2007 | Yadav | |
| 7,222,366 B2 | 5/2007 | Bruton, III et al. | |
| 7,240,368 B1 | 7/2007 | Roesch et al. | |
| 7,277,404 B2 | 10/2007 | Tanzella et al. | |
| 7,320,142 B1 | 1/2008 | Kasper et al. | |
| 7,322,044 B2 | 1/2008 | Hrastar | |
| 7,324,447 B1 | 1/2008 | Morford | |
| 7,324,804 B2 | 1/2008 | Hrastar et al. | |
| 7,331,061 B1 * | 2/2008 | Ramsey et al. | 726/23 |
| 7,383,577 B2 | 6/2008 | Hrastar et al. | |
| 7,424,744 B1 | 9/2008 | Wu et al. | |
| 7,441,267 B1 | 10/2008 | Elliott | |
| 7,509,380 B2 | 3/2009 | Motoyama | |
| 7,526,541 B2 | 4/2009 | Roese et al. | |
| 2002/0046275 A1 * | 4/2002 | Crosbie et al. | 709/224 |
| 2002/0053033 A1 * | 5/2002 | Cooper et al. | 713/201 |

(Continued)

OTHER PUBLICATIONS

"Norton Internet Security(TM) 2003 User's Guide," 2002, Symantec Corporation.*

(Continued)

*Primary Examiner* — Beemnet W Dada
*Assistant Examiner* — Darren B Schwartz
(74) *Attorney, Agent, or Firm* — Shumaker & Sieffert, P.A.

(57) ABSTRACT

A correlation database stores profiling data that describes packet flows within a network. A network device stores a set of rules for permissible packet flows within the network. The network device queries the correlation database and identifies any of the packet flows within the correlation database that are exceptions to the rules. Each of the rules may specify network elements and application-layer elements to define permissible traffic characteristics for the network.

14 Claims, 8 Drawing Sheets

U.S. PATENT DOCUMENTS

| | | | |
|---|---|---|---|
| 2002/0055998 A1 | 5/2002 | Riddle et al. | |
| 2002/0078370 A1* | 6/2002 | Tahan | 713/200 |
| 2002/0124187 A1 | 9/2002 | Lyle et al. | |
| 2002/0143939 A1 | 10/2002 | Riddle et al. | |
| 2002/0144156 A1 | 10/2002 | Copeland, III | |
| 2002/0198981 A1* | 12/2002 | Corl et al. | 709/224 |
| 2003/0004689 A1* | 1/2003 | Gupta et al. | 702/188 |
| 2003/0065953 A1 | 4/2003 | Lehmann et al. | |
| 2003/0084319 A1 | 5/2003 | Tarquini et al. | |
| 2003/0105976 A1* | 6/2003 | Copeland, III | 713/201 |
| 2003/0131263 A1 | 7/2003 | Keane et al. | |
| 2003/0149766 A1* | 8/2003 | Syvanne et al. | 709/224 |
| 2003/0149887 A1 | 8/2003 | Yadav | |
| 2003/0154399 A1 | 8/2003 | Zuk et al. | |
| 2003/0182580 A1* | 9/2003 | Lee | 713/201 |
| 2003/0204632 A1 | 10/2003 | Willebeek-LeMair et al. | |
| 2003/0212903 A1* | 11/2003 | Porras et al. | 713/200 |
| 2003/0217289 A1 | 11/2003 | Ammon et al. | |
| 2003/0236990 A1* | 12/2003 | Hrastar et al. | 713/200 |
| 2004/0015579 A1* | 1/2004 | Cooper et al. | 709/223 |
| 2004/0015719 A1* | 1/2004 | Lee et al. | 713/201 |
| 2004/0025044 A1 | 2/2004 | Day | |
| 2004/0034800 A1 | 2/2004 | Singhal et al. | |
| 2004/0083299 A1* | 4/2004 | Dietz et al. | 709/230 |
| 2004/0098623 A1 | 5/2004 | Scheidell | |
| 2004/0151382 A1* | 8/2004 | Stellenberg et al. | 382/219 |
| 2004/0181690 A1* | 9/2004 | Rothermel et al. | 713/201 |
| 2004/0255167 A1 | 12/2004 | Knight | |
| 2004/0268150 A1* | 12/2004 | Aaron | 713/201 |
| 2005/0018618 A1 | 1/2005 | Mualem et al. | |
| 2005/0044406 A1 | 2/2005 | Stute | |
| 2006/0095968 A1* | 5/2006 | Portolani et al. | 726/23 |
| 2006/0117386 A1 | 6/2006 | Gupta et al. | |
| 2006/0137009 A1* | 6/2006 | Chesla | 726/22 |
| 2009/0064333 A1 | 3/2009 | Saurabh et al. | |

OTHER PUBLICATIONS

U.S. Patent Application entitled "Application-Layer Monitoring and Profiling Network Traffic", U.S. Appl. No. 11/044,619, filed Jan. 27, 2005.

U.S. Patent Application entitled "Compound Attack Detection in a Computer Network", U.S. Appl. No. 11/045,572, filed on Jan. 27, 2005.

U.S. Patent Application entitled "Detection and Prevention of Encapsulated Network Attacks Using an Intermediate Device", U.S. Appl. No. 11/049,620, filed on Feb. 2, 2005.

U.S. Patent Application entitled "Remote Aggregation of Network Traffic Profiling Data", U.S. Appl. No. 11/044,481, filed on Jan. 27, 2005.

U.S. Patent Application entitled "Automated Change Detection Within a Network Environment", U.S. Appl. No. 11/044,240, filed on Jan. 27, 2005.

"Ethereal 0.10.0 has been released", Dec. 12, 2003, www.ethereal. com, retrieved from the Internet Archive WayBackMachine, indexed Jan. 1, 2004, 23 pgs.

Yannakakis, Perspectives on Database Theory, IEEE, Proceedings of $36^{th}$ Annual Symposium on Foundations of Computer Science, Milwaukee, Wisconsin, Oct. 23-25, 1995, 25 pgs.

Roelker, (Snort User Manual, HTTP inspect readme), Aug. 11, 2004, see §§ 2.1.7, 2.1.8, 2.1.10, 7 pgs.

Bitpipe, Reflex Interceptor Management Console Product Description, May 25, 2004, 1 pg.

Reflex Security, Reflex Interceptor Management Console Whitepaper, Jan. 29, 2004, 2 pgs.

Wikipedia, Cisco PIX, Apr. 9, 2009, 11 pgs.

"Intrusion Detection and Prevention," OneSecure, Inc., 2001 p. 1-6.

Notice of Allowance in U.S. Appl. No. 11/044,619, mailed Dec. 15, 2009, 8 pp.

Office Action from U.S. Appl. No. 11/044,240, dated Jan. 27, 2010, 17 pp.

Response to Office Action from U.S. Appl. No. 11/044,240, filed Apr. 27, 2010, 10 pp.

Office Action in U.S. Appl. No. 11/045,572, mailed May 14, 2010, 46 pp.

Response to Office Action in U.S. Appl. No. 11/045,572, dated Aug. 16, 2010, 19 pp.

Notice of Allowance in U.S. Appl. No. 11/049,620, mailed Dec. 9, 2009, 21 pp.

Notice of Allowance in U.S. Appl. No. 11/044,481, mailed May 28, 2010, 18 pp.

Notice of Allowance in U.S. Appl. No. 11/044,240, mailed Jun. 1, 2010, 12 pp.

Campos, et al., "Creation and Deployment of Data Mining-Based Intrusion Detection Systems in Oracle Database 10g", In Proceedings of the Fourth International Conference on Machine Learning and Applications, Sep. 2005, 8 pp.

Warshaw et al., "Monitoring Network Logs for Anomalous Activity", Applied Research Laboratories, Department of Computer Sciences, University of Texas at Austin, Oct. 9, 1998, 6 pp.

Warshaw et al., "VenusIDS: An Active Database Component for Intrusion Detection", Applied Research Laboratories, Department of Computer Sciences, University of Texas at Austin, Jun. 11, 1999, 12 pp.

Jain et al., "A Wakeup Call for Internet Monitoring Systems: The Case for Distributed Triggers", 2004, 6 pp.

* cited by examiner

IDENTIFICATION OF NETWORK POLICY VIOLATIONS

TECHNICAL FIELD

The invention relates to computer networks and, more particularly, to monitoring and profiling network traffic.

BACKGROUND

A computer network typically includes a collection of interconnected computing devices that exchange data and share resources. The devices may include, for example, web servers, database servers, file servers, routers, printers, end-user computers and other devices. The variety of devices may execute a myriad of different services and communication protocols. Each of the different services and communication protocols exposes the network to different security vulnerabilities. Moreover, each version of a particular protocol or service may also have different vulnerabilities and potential security risks. Further, devices may be misconfigured, and unwanted applications or services may be present within the enterprise network. As a result, it is often difficult for a network administrator to accurately determine a security posture for a computer network.

SUMMARY

In general, the invention is directed to techniques for detecting and preventing network attacks. More specifically, an intrusion detection and prevention (IDP) device is described that includes network profiling capabilities. A profiler module within the IDP device monitors an enterprise network and learns network elements as well as application-layer elements presently associated with the network. For example, the IDP device monitors traffic within the enterprise network to learn of network hosts, ports, peers and other network elements.

In addition, the IDP device utilizes a set of protocol-specific decoders to further analyze the traffic to learn the application-layer elements. In particular, the protocol decoders provide protocol-specific "context" and "values" from the network traffic. The profiler software module correlates the protocol-specific information produced by the protocol decoders to the network elements by building associations between the application-layer elements and the network elements. The profiler software may build the correlations within a relational database (i.e., a correlation database) and provide mechanisms for querying the correlation database. The profiler module may locally store the correlation database, or may provide a mechanism for efficiently communicating the application-layer information to a remote device.

The IDP device may provide mechanisms for automatically identifying changes within the enterprise network. For example, the IDP device allows a system administrator or other user to configure database triggers for the correlation database. For example, the system administrator may configure database triggers to detect new hosts, users, protocols or applications. As the protocol decoders analyze the enterprise traffic and the profiler module builds the application-layer associations within the database, the profiler maintains a log of database operations (e.g., inserts, updates or deletes) that fire the defined triggers. This allows the system administrator to identify network changes that may expose security risks and apply measures to preserve the security posture of the enterprise.

Further, the IDP device may provide a mechanism for detecting network traffic that violates the enterprise policies. In particular, the IDP device allows a system administrator or other user to define a "policy violation" object that comprises a set of rules. Each rule defines permissible traffic characteristics (e.g., flows) for the network. In this manner, the set of rules may reflect the actual policies implemented by the enterprise. The IDP device applies the policy violation object to the correlation database, and produces a result set that lists entries that violate the rules. In this manner, the result set identifies traffic flows that the system administrator does not expect to be present within the enterprise. This information can be used to assist the system administrator in identifying misconfigured devices, firewall holes and unwanted devices or services.

In one embodiment, a method comprises maintaining profiling data that describes packet flows within a network, and defining a policy violation object that specifies a set of rules for permissible packet flows within the network. The method further comprises applying the policy violation object to the profiling data to identify any of the packet flows that satisfy none of the rules.

In another embodiment, a system comprises a correlation database that stores profiling data that describes packet flows within a network. A network device stores a set of rules for permissible packet flows within the network. The network device queries the correlation database and identifies any of the packet flows within the correlation database that are exceptions to the rules.

In another embodiment, a computer-readable medium comprises instructions to cause a processor to present a user interface by which a user defines a policy violation object that specifies a set of rules for a network. The instructions further cause the processor to query a correlation database storing profiling data to identify packet flows within the network that satisfy none of the rules.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
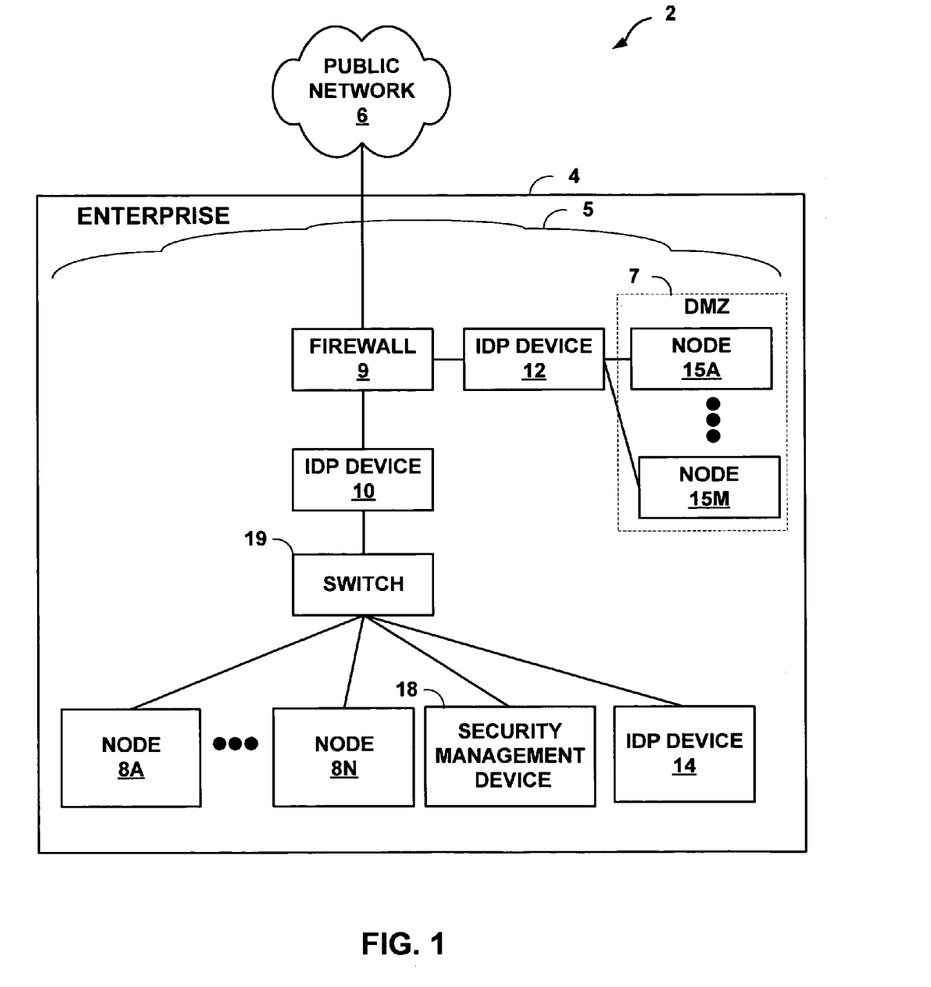
FIG. 1 is a block diagram illustrating an exemplary enterprise computer network in which an intrusion detection and prevention (IDP) device monitors network traffic and correlates network and application-layer elements in accordance with the principles of the invention.

FIG. 1 is a block diagram illustrating an exemplary system 2 in which enterprise 4 includes a private enterprise computing network 5 that is coupled to public network 6, such as the Internet. Firewall 9 protects enterprise network 5 and, in particular, internal computing nodes 8A-8N. Computing nodes 8A-8N (computing nodes 8) represent any private computing device within enterprise network 5, including workstations, file servers, print servers, database servers, printers and other devices.

In addition, firewall 9 may provide a "demilitarized zone" (DMZ) 7, which represents a semi-private area of enterprise network 5 that supports limited access by public network 6 via specific communication protocols. For example, client devices (not shown) within public network 6 may have limited access to nodes 15A-15M via the hypertext transport protocol (HTTP) or the file transfer protocol (FTP).

In the example of FIG. 1, enterprise network 5 includes intrusion detection and prevention (IDP) device 10 that monitors traffic flowing between firewall 9 and internal computing nodes 8. IDP device 10 analyzes the network traffic and dynamically "learns" the network elements associated with the network traffic. As used herein, the term "network elements" refers to hosts, peers, ports, address and other lower-level information associated with the network traffic.

In addition, IDP device 10 utilizes a set of protocol-specific decoders (not shown in FIG. 1) to analyze the network traffic and provide application-layer visibility. In particular, the protocol decoders extract protocol-specific "context" and "values" from the network traffic. IDP device 10 correlates the protocol-specific information produced by the protocol decoders with the network elements by mapping the application-layer elements detected by the protocol decoders to the network elements. IDP device 10 builds the correlations within a relational database (not shown in FIG. 1) and provides mechanisms by which a system administrator or other user queries the correlation database for report generation and analysis.

In some embodiments, IDP device 10 provides mechanisms for automatically identifying changes within enterprise network 5. For example, IDP device 10 allows the system administrator to define database triggers for the correlation database. The system administrator may configure database triggers to detect new hosts, users, protocols, applications or other changes to the network. IDP device 10 builds the application-layer associations within the database and maintains a log of database operations (e.g., inserts, updates or deletes) that fire the defined triggers. This allows the system administrator to identify network changes that may expose security risks and apply measures to preserve the security posture of enterprise network 5.

IDP device 10 may also provide mechanisms for detecting network traffic that violates the policies of enterprise 4. In particular, IDP device 10 allows the system administrator to define a "policy violation" object that comprises a set of rules. Each rule defines permissible traffic characteristics (e.g., flows) for the network. In this manner, the set of rules may reflect the actual policies implemented by the enterprise, such as policies implemented by firewall 9. IDP device 10 applies the policy violation object to the correlation database and produces a result set that lists exceptions, i.e., entries within the correlation database that fail to satisfy any of the rules. In this manner, the result set identifies traffic flows that the system administrator does not expect to be present within the enterprise. This information can be used to assist the system administrator in identifying misconfigured devices, firewall holes and unwanted devices or services.

In some embodiments, IDP device 10 maintains a small cache of application-layer correlations, and provides a mechanism for efficiently communicating the information to a remote security management device 18 or other device for storage for storage within a relational database. In this manner, security management device 18 may operate as a central device for aggregating application-layer information from multiple IDP devices 10, 12 and 14 located within different regions (e.g., sub-networks) of enterprise, network 5.

Although the example illustrated in FIG. 1 is described in terms of dedicated IDP devices 10, 12 and 14, the functionality described herein may be incorporated within other devices, such as firewall 9 or switch 19. These devices may have limited persistent storage, and the aggregation features of security management device 18 may be particularly useful in these applications.

Figure 2:
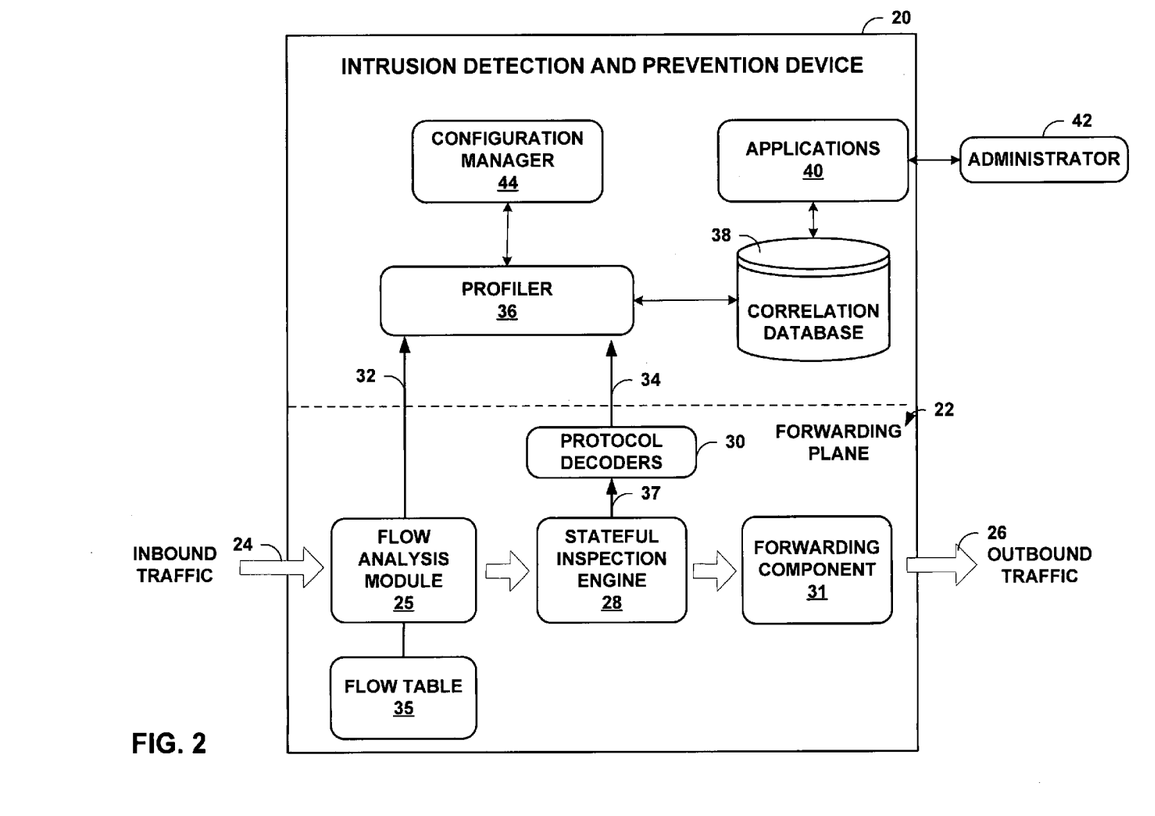
FIG. 2 is a block diagram illustrating an exemplary embodiment of IDP device in further detail.

FIG. 2 is a block diagram illustrating an example embodiment of an IDP device 20. IDP device 20 includes a forwarding plane 22 that monitors inbound network traffic 24 and transparently forwards the network traffic as outbound network traffic 26. In the illustrated example, FIG. 2, forwarding plane 22 includes flow analysis module 25, stateful inspection engine 28, protocol decoders 30 and forwarding component 31.

Flow analysis module 25 receives inbound traffic 24 and identifies network flows within the traffic. Each network flow represents a communication session within the network traffic and is identified by at least a source address, a destination address and a communication protocol. Flow analysis module 25 may utilize additional information to specify network flows, including source media access control (MAC) address, destination MAC address, source port and destination port.

Flow analysis module 25 maintains data within flow table 35 that describes each active flow present within the network traffic. Flow analysis module 25 outputs commands 32 that reflect changes to flow table 35. In particular, flow analysis module 25 outputs ADD_FLOW, REMOVE_FLOW and UPDATE_FLOW commands 32 as it modifies flow table 35 to reflect the current network flows. In this fashion, each of commands 32 represents an operation performed on flow table 35 and conveys network elements associated with each operation, i.e., low-level information such as network hosts, peers, and ports associated with the network traffic.

For each packet stream, stateful inspection engine 28 buffers a copy of the packets and reassembles the copied packets to form application-layer communications 37. In addition, stateful inspection engine 28 invokes the appropriate one of protocol decoders 30 to analyze the application-layer communications 37. Protocol decoders 30 represent a set of one or more protocol-specific software modules. Each of protocol decoders 30 corresponds to a different communication protocol or service. Examples of communication protocols that may be supported by protocol decoders 30 include the HyperText Transfer Protocol (HTTP), the File Transfer Protocol (FTP), the Network News Transfer Protocol (NNTP), the Simple Mail Transfer Protocol (SMTP), Telnet, Domain Name System (DNS), Gopher, Finger, the Post Office Protocol (POP), the Secure Socket Layer (SSL) protocol, the Lightweight Directory Access Protocol (LDAP), Secure Shell (SSH), Server Message Block (SMB) and other protocols.

Protocol decoders 30 analyze reassembled application-layer communications 37 and extract application-layer elements 34. As used herein, the term "application-layer elements" refer to protocol-specific information obtained at the application-layer. In particular, protocol decoders 30 extract protocol-specific "contexts" and "values" from the reassembled application-layer communications. In general, "contexts" are named elements within a protocol stream that uniquely identifies various application-layer elements. Example of contexts includes file names, user names, application names, names of attached documents, protocol-specific header information and other information that describes the communication session. For example, a context for an HTTP protocol stream includes the name of a server providing the HTTP service and the name of the type of web browser (e.g., Internet Explorer) accessing the server. By reassembling application-layer communications, protocol decoders 30 extract specific contexts (e.g., browser type) and corresponding values (e.g., Internet Explorer). Protocol decoders output application elements 34 to profiler 36 for profiling and subsequent analysis.

In addition, protocol decoders 30 apply protocol-specific algorithms to analyze the application-elements to determine whether each packet stream represents a security risk, e.g., a network attack. If no security risk is detected, stateful inspection engine 28 sends the original packets to forwarding component 31 for forwarding to the corresponding destinations. Forwarding component 31 may, for example, maintain a routing table that stores routes in accordance with a topology of the enterprise network.

Profiler 36 receives commands 32 that describe the updates to flow table 35 and the network elements associated with the network flows. In addition, profiler 36 receives application-layer elements 34 from protocol decoders 30. Profiler 36 correlates the network elements and the application-layer elements within correlation database 38. In particular, profiler 36 stores the network elements and application-layer elements 34 within correlation database 38, and builds associations between the application-layer and the network elements. Correlation database 38 may be a relational database, such as SQL Server from Microsoft Corporation.

Applications 40 allow users, such as administrator 42, to query correlation database 38 for report generation and analysis. For example, administrator 42 may interact with applications 40 to query correlation database 38 and view the associations between application-layer elements and network elements for the network traffic within the enterprise network.

Configuration manager 44 presents a user interface by which administrator 42 configures profiler 36. For example, administrator 42 may configure profiler 36 to monitor particular subnets of the enterprise network. When building associations within correlation database 38, profiler 36 may associate all external source network addresses with a single external source to reduce storage requirements and aid analysis.

Figure 3:
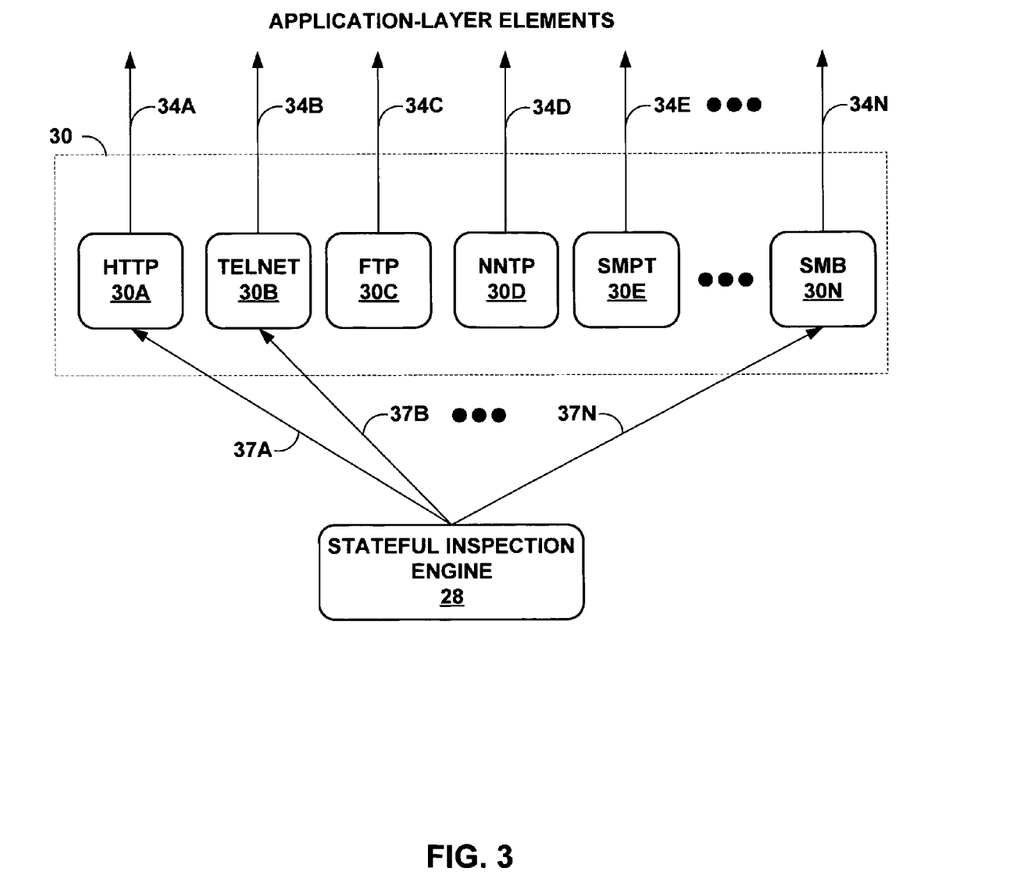
FIG. 3 illustrates a portion of the IDP device of FIG. 2 in further detail

FIG. 3 illustrates a portion of IDP device 20 (FIG. 2) in further detail. In particular, FIG. 3 illustrates an exemplary set of protocol decoders 30A-30N. In this example, protocol decoders 30A-30N include HTTP decoder 30A, Telnet decoder 30B, FTP decoder 30C, NNTP decoder 30D, SMTP decoder 30E and Small Message Block (SMB) decoder 30N.

As illustrated in FIG. 3, each of protocol decoders 30A-30N analyzes corresponding protocol-specific application-layer communications 37A-37N that have been reassembled by stateful inspection engine 28. Based on the analysis, each of protocol decoders 30A-30N extract and output corresponding application-layer elements 34A-34N describing contexts and values associated with each communication session for the respective protocol.

Figure 4:
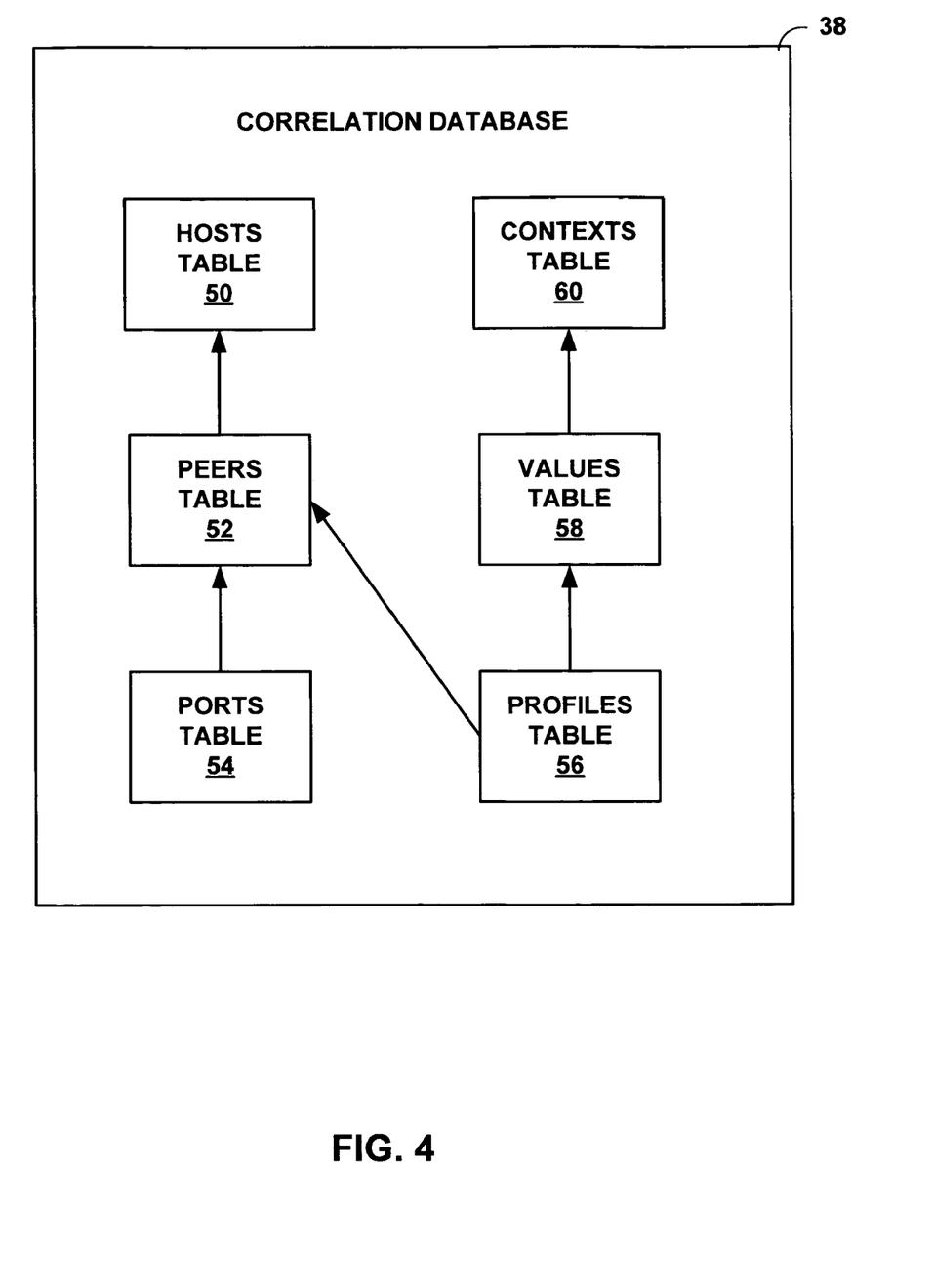
FIG. 4 is a block diagram that illustrates an example embodiment for correlation database.

FIG. 4 is a block diagram that illustrates an example embodiment for correlation database 38. In the example embodiment, correlation database 38 includes hosts table 50, peers table 52 and ports table 54 that store low-level network elements. In addition, correlation database 38 includes profiles table 56, values table 58 and contexts table 60 that store application-layer elements. Profiler 36 (FIG. 2) builds associations between the network elements and application-layer elements by way of database relationships, as indicated by arrows within FIG. 4.

Hosts table 50 stores data identifying individual nodes that act as either sources or destinations for one or more network flows within the network traffic. For example, hosts table 50 may comprises a set of rows, where each row corresponds to a different network device, i.e., either a source device or a destination device. Each row may store an Internet Protocol (IP) address, MAC address and other information low-level network elements for corresponding device. Profiler 36 analyzes commands 32 (FIG. 2) and the associated network elements and updates hosts table 50 as communications from or to new devices are detected.

Peers table 52 stores data identifying "peers," i.e., pairs of hosts that have established a communication session. For example, peers table 52 may comprise a set of rows, where each row identifies a pair of hosts listed within hosts table 50. Profiler 36 analyzes commands 32 and the associated network elements update the rows to represent the peer relationships within the network traffic.

Ports table 54 stores data specifying the particular ports utilized by the peers when communicating. For example, two peers may communicate via HTTP using port 80. As another example, two peers may communicate via FTP using port 21.

Contexts table 60 stores data specifying named elements for each type of protocol. The named elements provide an application-layer basis for describing a communication session. Example of named elements includes file names, user names, application names and other information that describes the application-layer of the communication session. For example, a context for an HTTP protocol stream may include the name of a server providing the HTTP service and the type of web browser accessing the server. Contexts table 60 defines the types of named elements that describe the application-layer of the communication sessions within the network traffic.

Values table 58 stores particular values for the named elements specified by contexts table 60. For example, contexts table 60 may specify a context of BROWSER for an HTTP protocol, and values table 58 may include particular values of "Internet Explorer," "FireFox" and "Mozilla" for different communication sessions within enterprise 4.

Profiles table 56 associates peers specified within peers table 52 with specific application-layer values specified within values table 58. In this manner, profiles table 56 may be viewed as defining profiles that map application-layer contexts and values with particular communication sessions between peers.

Figure 5:
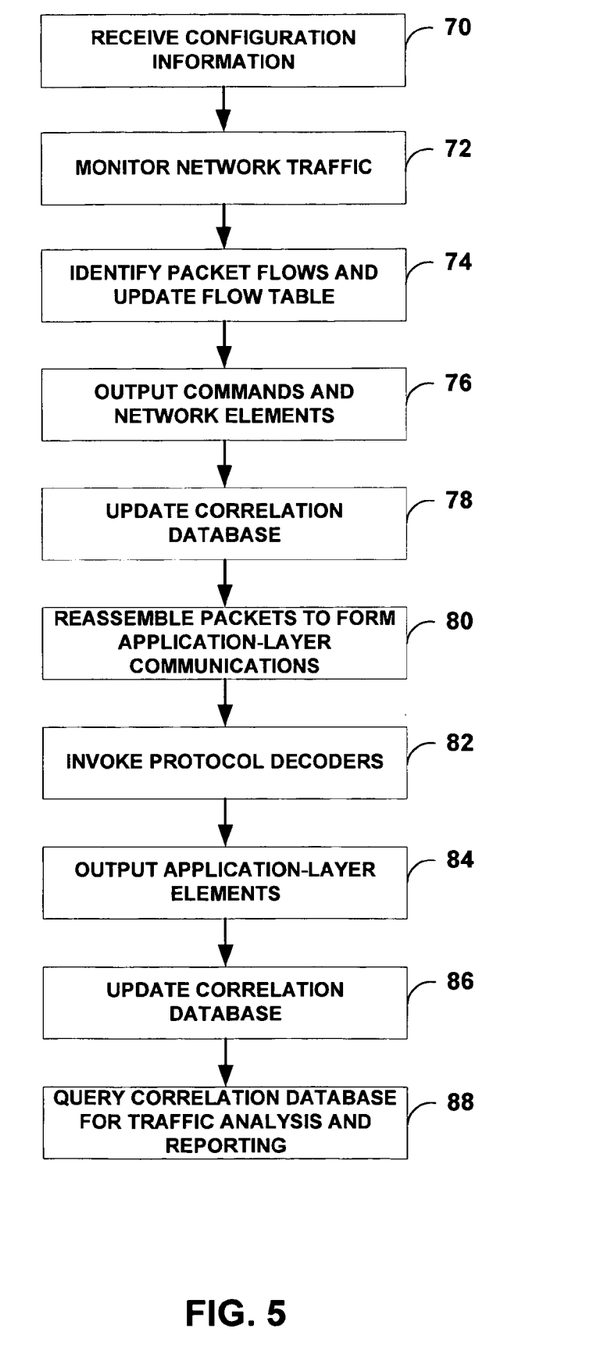
FIG. 5 is a flowchart illustrating exemplary operation of an IDP device in accordance with the principles of the invention.

FIG. 5 is a flowchart illustrating exemplary operation of an IDP device in accordance with the principles of the invention. For exemplary purposes, the flowchart is described in reference to IDP device 20 (FIG. 2).

Initially, configuration manager 44 receives configuration information from administrator 42 and, in response, configures IDP device 20 to monitor subnets of interest (70). Once configured, IDP device 20 monitors inbound network traffic 24 (72). In some configurations, stateful inspection engine 28 of forwarding plane 22 may receive network traffic and mirror the network traffic for purposes of analysis. Forwarding plane 22 seamlessly forwards the original network traffic.

Flow analysis module 25 analyzes the network traffic to identify packets flows and updates flow table 35 to describe each active flow present within the network traffic (74). While updating flow table 35, flow analysis module 25 outputs commands 32 (e.g., ADD_FLOW, REMOVE_FLOW and UPDATE_FLOW commands) and corresponding network elements to reflect the current network flows (76). Profiler 36 receives commands 32 and updates hosts table 50, peers table 52 and ports table 54 of correlation database 38 based on the received commands and respective network elements (78).

Next, stateful inspection engine 28 buffers and reassembles the packets to form application-layer communications 37 (80), and invokes the appropriate protocol decoders 30 to analyze the application-layer communications (82). Protocol decoders 30 analyze reassembled application-layer communications 37 and communicate application-layer elements 34 to profiler 36 (84).

Profiler 36 receives application-layer elements 34 and updates profiles table 56, values table 58 and contexts table 60 of correlation database 38 based on the received application-layer elements (86). In this fashion, profiler 36 correlates the network elements and the application-layer elements within correlation database 38. In some embodiments, profiler 36 does not correlate each individual network flow within correlation database 38. Rather, profiler 36 maintains totals describing the number of packet flows having the same network elements and application-layer contexts and values. For example, profiler 36 may update profiles table 56, values table 58 and contexts table 60 to record a first, last and total number of sessions between two peers using the same application-layer contexts and values. This approach may lead to data reduction and simplify analysis.

Finally, applications 40 query correlation database 38 for report generation, security assessment and traffic analysis (88).

Figure 6:
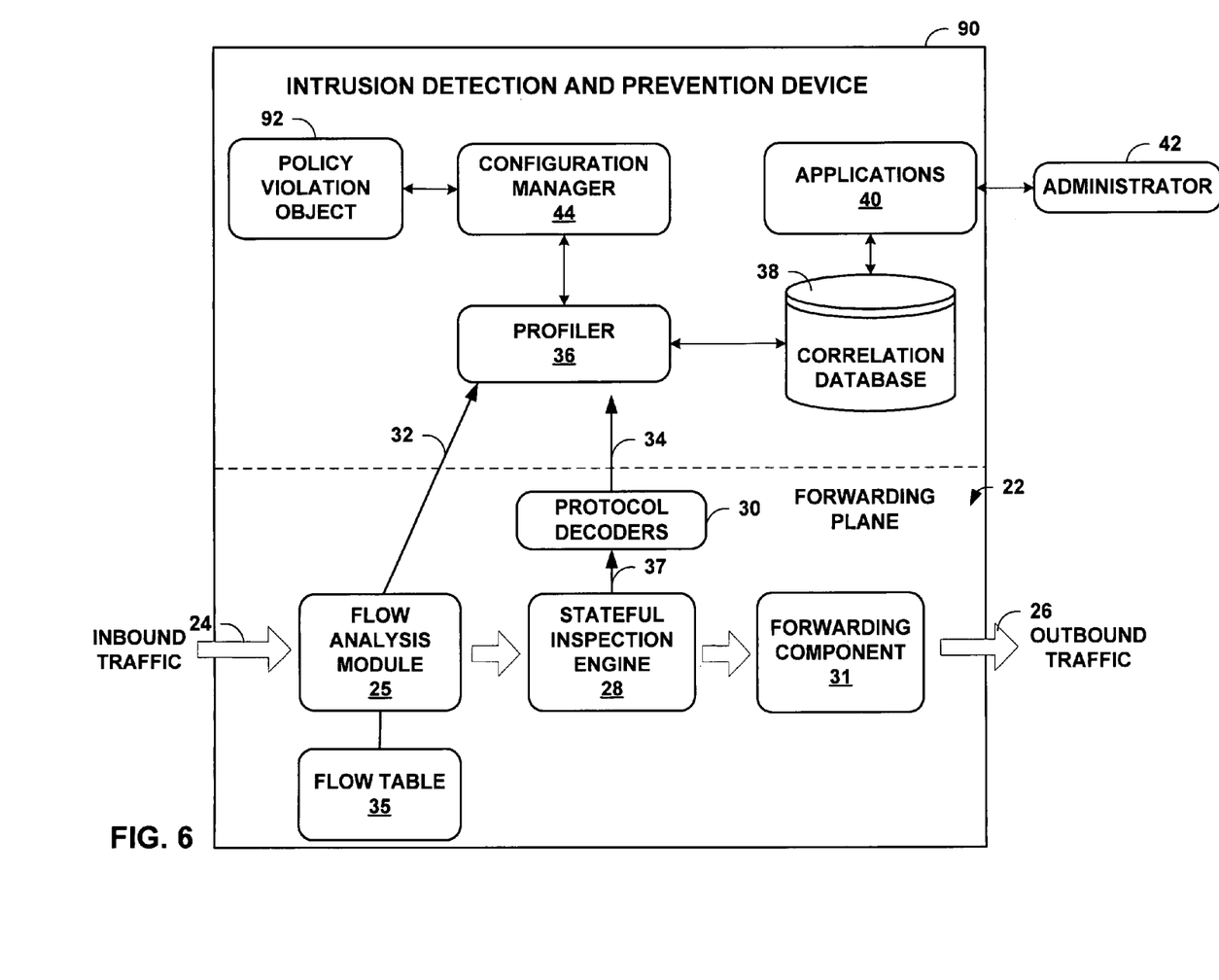
FIGS. 6 and 7 block diagrams illustrating additional embodiment of an exemplary IDP devices.

FIG. 6 is a block diagram illustrating an example IDP device 90 that generally conforms to IDP device 20 described above. In addition, configuration manager 44 allows administrator 42 to define a policy violation object 92 that specifies a set of rules. Each rule utilizes network elements and application-layer elements to define permissible traffic characteristics (e.g., flows) for the enterprise network. In this manner, policy violation object 92 may be viewed as a pseudo firewall in that the set of rules may reflect the actual policies implemented by the enterprise, e.g., via one or more actual firewalls, network scanners and other devices.

Upon a request from administrator 42, configuration manager 44 applies policy violation object 92 to correlation database 38 to produce a result set that lists entries within the correlation database that violate the rules. In other words, profiler 36 applies one or more queries to correlation database 38 and instead of identifying matching entries configuration manager 44 produces a result set that includes any exceptions that fail to satisfy the rules defined by policy violation object 92. Consequently, the result set identifies traffic flows profiled within correlation database 38 that administrator 42 does not expect to be present within the enterprise.

For example, administrator 42 may define pseudo firewall 92 with the following rules:

Rule #1: src_ip=Engineering, dst_ip=Accounting, port-TCP/139, smb_user=administrator
Rule #2: src_ip=Engineering, dst_ip=Marketing, port-TCP/21, telnet_user=administrator In this example, rule #1 defines a first rule that permits traffic having a source address within an "Engineering" address range that accesses a destination IP address within an "Accounting" address range using the TCP protocol over port 139 where the "smb_user" application-layer element has a value equal to "administrator." Similarly, rule #2 defines a second rule as any traffic having a source address of within an Engineering address range that accesses a destination IP address within a Marketing address range using the TCP protocol over port 21 where the "telnet_user" application-layer element has a value equal to "administrator."

In this manner, network elements and protocol-specific application-layer elements may be combined to form policy rules for purposes of examining profiled network traffic. Configuration manager 44 applies policy violation object 92 to correlation database 38 and returns a resultant data set describing any communication sessions that fail to match the rules, i.e., policy violations. In this example, profiler 36 may return data describing any profiled network traffic associated with an SMB session from engineering to accounting or an Telnet session from engineering to marketing where the user is not an authorized administrator. Administrator 42 uses this information in identifying malicious behavior, misconfigured devices, firewall holes and unwanted devices or services. For example, administrator 42 may interact with IDP device 90 to apply additional report filters to view the exceptions for particular hosts, subnets, protocols or other criteria.

In one embodiment, stateful inspection engine 28 may maintain and apply policy violation object 92 to correlation database 38. In the event policy violations are detected, stateful inspection engine 28 may automatically update forwarding rules within forwarding component 31 to drop traffic associated with the violations.

Figure 7:
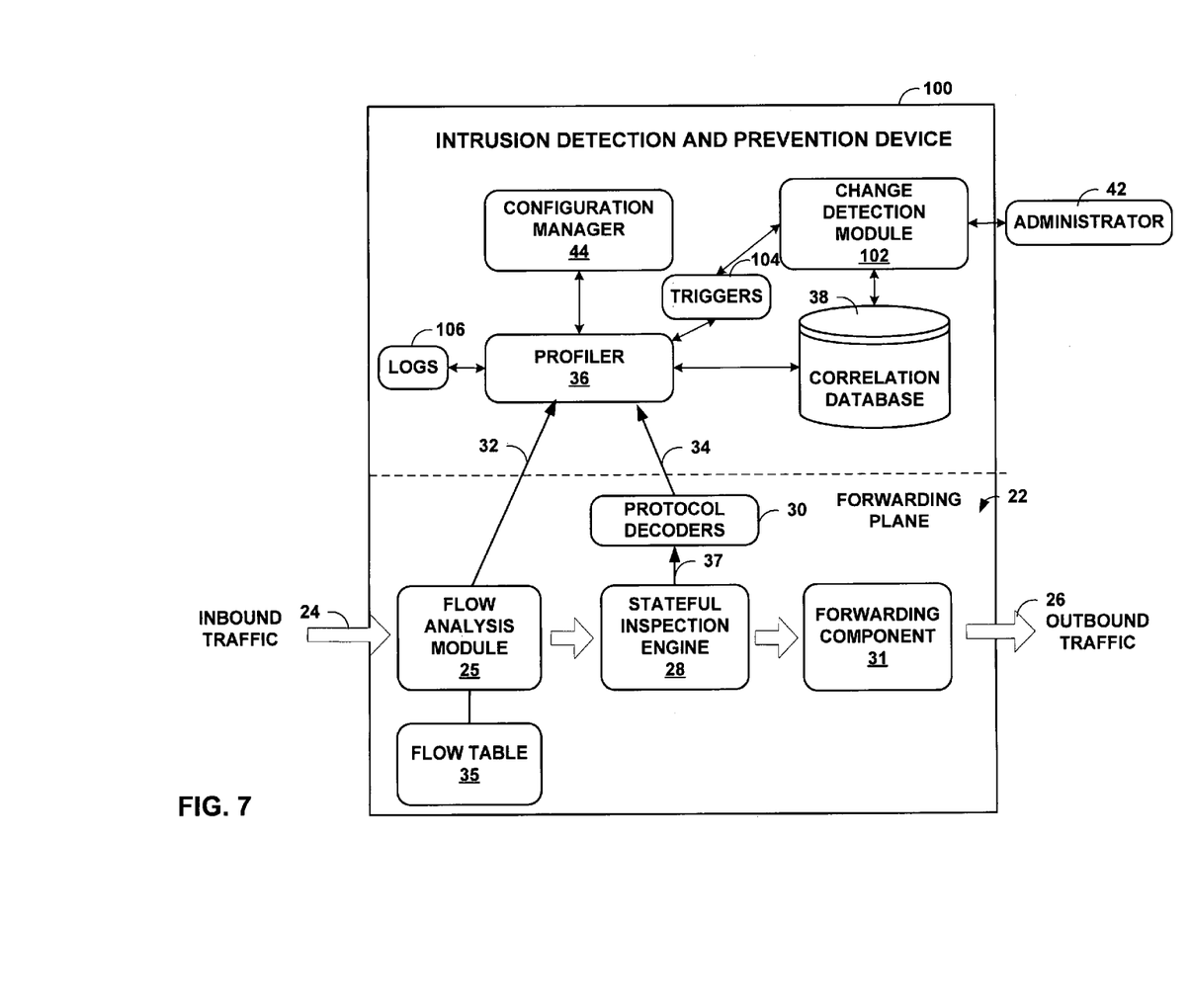

FIG. 7 is a block diagram illustrating an example IDP device 100 that generally conforms to IDP device 20 described above with respect to FIG. 2. In the example embodiment of FIG. 7, IDP device 100 includes change detection module 102 that aids administrator 42 in identifying changes within the enterprise network.

Change detection module 102 presents a user interface with which administrator 42 interacts to define database triggers 102 for correlation database 32. Administrator 42 may configure database triggers 104 to detect database operations that update correlation database 32 with a specified combination of network elements and application-layer elements. As one example, change detection module 102 may define a database trigger that "fires" when profiler 36 performs a database insert operation that specifies newly detected peers that utilize a particular version of a communication protocol. As another example, change detection module 102 may define a database trigger that fires when a new host is detected that utilizes a particularly vulnerable software version of a web service or email protocol. In this manner, database triggers 104 may utilize any combination of network and application-layer elements. Other examples include detection of new hosts appearing on the enterprise network, new peers and ports being utilized, new users, new applications and protocol commands appearing on the network and other network changes.

When one of database triggers 104 fires, profiler 36 updates logs 106 to record the database operation or operations for subsequent analysis and reporting by change detection module 102 or other software application. In this fashion, IDP device 100 may aid administrator 42 in identifying changes within the enterprise network, allowing the administrator to apply any measures necessary to preserve the security of the network, such as applying any appropriate security patches or disabling undesired services.

Figure 8:
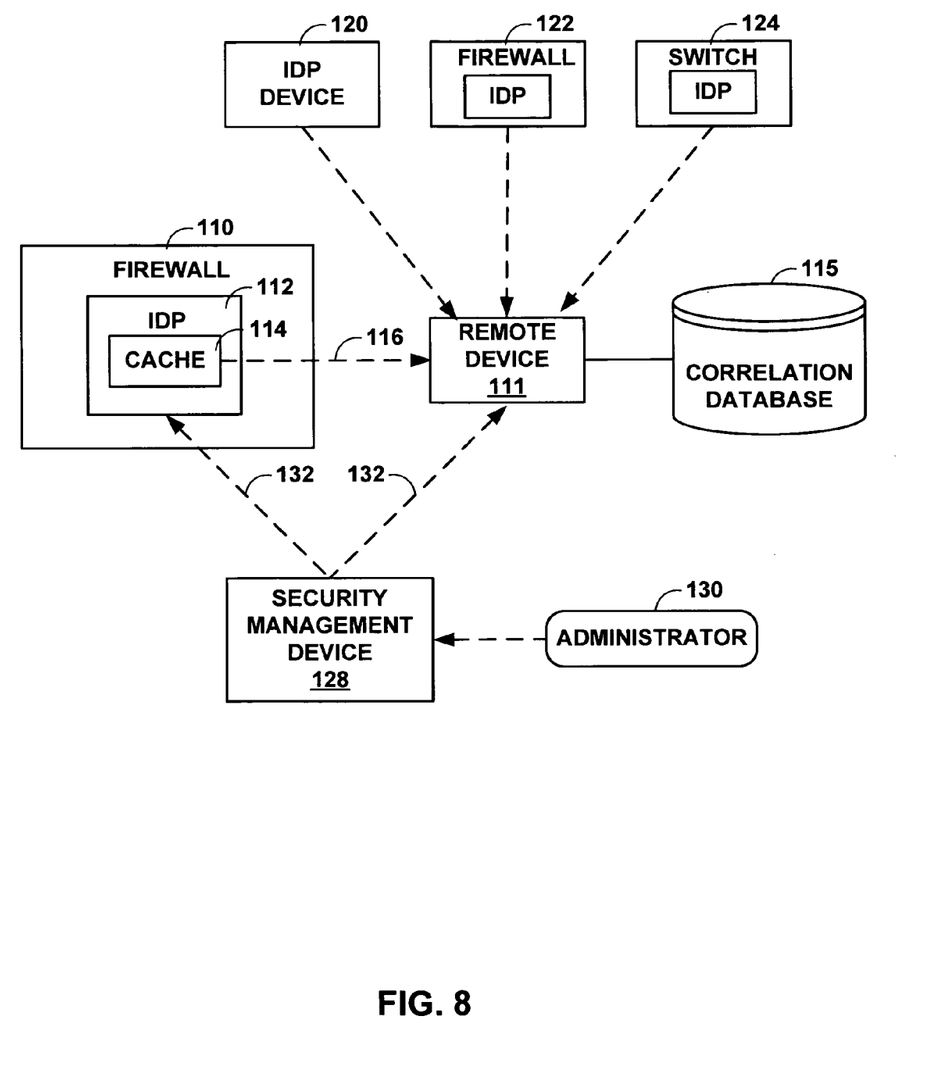
FIG. 8 is a block diagram in which a firewall incorporates an IDP module that provides network profiling functions described herein.

FIG. 8 is a block diagram in which a firewall 110 incorporates an IDP module 112 that provides some or all of the network profiling functions described herein. For example, IDP module 112 generally includes the components described with respect to IDP device 20 (FIG. 2). Although described in reference to firewall 110, IDP module 112 may be incorporated within other devices within an enterprise network, such as switches, routers, intelligent hubs or gateways or other devices.

In the example of FIG. 8, firewall 110 has limited persistent storage. To address this limitation, IDP module 112 does not maintain a complete local correlation database. Rather, IDP module 112 maintains a small, in-memory cache 114 of network elements and application-layer correlations. Cache 114 may be organized in a manner similar to correlation database 38 of FIG. 4. In particular, cache 112 may include a hosts table, peers table and ports table 54 that store low-level network elements, and a profiles table, values table, and a contexts table that store application-layer elements. In other words, cache 114 may be stored as a small, in-memory database in accordance with the schema described in FIG. 4. IDP module 112 builds associations within cache 114 between the network elements and application-layer elements by way of database relationships as described above.

As IDP module 112 updates cache 114, IDP module 112 outputs communications 116 to mirror stateful database operations (e.g., insert, update and remove operations) to remote device 111. Remote device 111 may be directly coupled to firewall 110 or remotely located anywhere within the enterprise network. Remote device 111 receives the database operations by way of communications 116 and builds correlation database 115 to provide persistent storage.

Further, remote device 111 may aggregate profiling data from other devices that incorporate the IDP functions described herein, such as a standalone IDP device 120, a second firewall 122 and an intelligent switch 124. When aggregating the profiling data, remote device 111 automatically correlates information received from the different sources. For example, remote device 111 ensures that a hosts table within correlation database 115 accurately reflects the hosts detected within the enterprise network, and eliminates duplicate entries in the event the same host is detected by different IDP-enabled devices, e.g., firewall 110, IDP device 120, firewall 122 or switch 124. In similar fashion, remote device 111 ensures that other tables of correlation database 115, such as contexts and values tables, accurately reflect application-layer elements detected by different IDP-enabled devices. In this manner, remote device 111 intelligently aggregate network profiling data from multiple IDP-enabled devices.

In one embodiment, IDP module 112 sends incremental data to remote device 111 to conserve network bandwidth. For example, IDP module 112 may output communications 116 only when new elements are inserted within cache 114. In other words, IDP module 112 may not send communications 116 when elements within cache 114 are merely updated with new values.

Further, each table of cache 114 may comprise a limited capacity (e.g., number of rows) for caching network and application-layer elements. IDP module 112 may employ a least-recently used (LRU) technique for replacing entries within cache 114 in the event the capacity of one or more tables is reached. In particular, IDP module 112 may maintain modification timestamps for each entry within cache 114. When inserting a new entry into a full table, IDP module 112 replaces the entry having the oldest timestamp and communicates the replaced entry to remote device 111 for aggregation within correlation database 115.

Further, IDP module 112 may employ deferred replacement for any entries in the other tables that are related to the replaced entry. Specifically, IDP module 112 may defer communicating the related entries to remote device 111 until such time as the capacity for the tables storing those entries is reached.

Security management device 128 provides a user interface by which administrator 130 configures the generation and aggregation of profiling data. In particular, administrator 130 interacts with security management device 128 to provide configuration information 132 to firewall 110 and other IDP-enabled devices (e.g., IDP device 120, firewall 122 or switch 124). Configuration data 132 may specify, for example, particular subnets of interest. Further, configuration data 132 may specify a network address of remote device 111 to which firewall 110 and the other IDP-enabled devices communicate profiling data.

In addition, security management device 128 may allow administrator 130 to define a policy violation object as described above with respect to FIG. 6. Security management device 128 may apply the policy violation object to the aggregated profiling data stored within correlation database 115. In this manner, security management device 128 may detect exceptions within the aggregate profiling data that fail to satisfy the rules defined by policy violation object, thereby identifying traffic flows that administrator 130 does not expect to be present within the enterprise.

Further, security management device 128 may execute other queries on correlation database 115 at the request of administrator 130. Correlation database 115 allows correlation based on events generated by different IDP-enabled devices. For example, application-layer elements describing a VPN failure event from firewall 110 may be used to identify a client device associated with the failure and to retrieve historical information for the client device.

Various embodiments of the invention have been described. Although the embodiments have been described in terms of packet-based systems and methods, any network and application-layer profiling data may be correlated for other types of networks without departing from the principles of the invention. These and other embodiments are within the scope of the following claims.

The invention claimed is:

1. A method comprising:
  receiving, with an intrusion detection and prevention (IDP) device, network traffic flowing between a firewall and one or more computing nodes within a network;
  identifying, with the IDP device, packet flows within the network traffic;
  processing the packet flows with the IDP device to identify network elements associated with the packet flows;
  forming application-layer communications from the packet flows with the IDP device;
  processing the application-layer communications with protocol-specific decoders included within the IDP device to identify application-layer elements;
  analyzing the application-layer elements to determine whether each of the packet flows represents a network attack;
  based on the determination, forwarding packets of the packet flows to a destination identified by each of the packets;
  generating profiling data to associate the application-layer elements of the application-layer communications with the network elements of the packet flows;
  defining, with the IDP device, a policy violation object that specifies a set of rules for permissible packet flows within the network traffic expected to be output from the firewall, wherein each of the rules specifies network elements and application-layer elements to define permissible traffic characteristics for the permissible packet flows, and wherein the rules represent policies expected to be implemented by the firewall;

applying, with the IDP device, the policy violation object to the profiling data to identify any of the packet flows within the network traffic output from the firewall that satisfy none of the rules; and producing, with the IDP device, a report listing the identified packet flows as packet flows that are not expected to be present within the network based on the application of the policy violation object to the profiling data generated by the IDP device.

2. The method of claim 1, wherein applying the policy violation object comprises applying the policy violation object to a database to identify any of the packet flows that are exceptions to the rules.

3. The method of claim 1, wherein applying the policy violation object comprises applying a query to a database.

4. The method of claim 1, wherein at least one of the rules specifies a permissible packet flow and includes a source address range and a destination address range.

5. The method of claim 1, wherein generating profiling data comprises:

storing the network elements and the application-layer elements in a database; and defining relationships within the database to associate the network elements of the packet flows with the application-layer elements of the application-layer communications.

6. The method of claim 5, wherein the network elements comprise data defining hosts associated with the packet flows, data defining peers for each of the packet flows, and data defining ports associated with the packet flows, and wherein defining relationships within the database comprises mapping each of the application-layer elements to a respective one of the peers.

7. The method of claim 5, wherein processing the application-layer communications comprises processing the application-layer communications with protocol-specific decoders for at least one of a HyperText Transfer Protocol (HTTP) decoder, a File Transfer Protocol (FTP) decoder, a Network News Transfer Protocol (NNTP) decoder, a Telnet decoder, a Domain Name System (DNS) decoder, a Gopher decoder, a Finger decoder, a Post Office Protocol (POP) decoder, a Secure Socket Layer (SSL) protocol decoder, a Lightweight Directory Access Protocol (LDAP) decoder, a Secure Shell (SSH) decoder, a Server Message Block (SMB) decoder or a Simple Mail Transfer Protocol (SMTP) decoder.

8. The method of claim 1, further comprising automatically updating forwarding rules within a forwarding component to drop those of the packet flows that satisfy none of the rules.

9. A system comprising:

an intrusion detection and prevention (IDP) device; and a firewall that implements policies and applies the policies to packet flows within a network before forwarding the packet flows to the IDP device wherein the IDP device includes:

a flow analysis module that receives packet flows output from the firewall, processes the packet flows and identify the network elements associated with the packet flows;

an analysis engine that forms application-layer communications from the packet flows;

a plurality of protocol-specific decoders that process the application-layer communications to generate the application-layer elements;

a stateful inspection engine that analyzes the application-layer elements to determine whether each of the packet flows represents a network attack;

a forwarding component that forwards packets of the packet flows to a destination identified by each of the packets based on the determination, wherein the profiler further generates the profiling data by correlating the application-layer elements of the application-layer communications with the network elements of the packet flows;

a correlation database that stores the profiling data describing the packet flows to which the firewall previously applied the policies;

a user interface by which a user defines a set rules for permissible packet flows expected to be within the network as a policy violation object that identifies one or more of the packet flows to which the firewall has previously applied the policies as the permissible packet flows, wherein each of the rules specifies network elements and application-layer elements to define permissible traffic characteristics for the packet flows within the network, and wherein the rules represent the policies expected to be implemented by the firewall;

a profiler that queries the correlation database and identifies any of the packet flows within the correlation database that are exceptions to the rules; and a configuration manager that produces a report listing the identified packet flows as packet flows that are not expected to be present within the network based on the application of the policy violation object to the profiling data generated by the IDP device.

10. The system of claim 9, wherein the profiling data maps the application-layer elements to the network elements.

11. The system of claim 9, wherein the plurality of protocol-specific decoders include at least one of a HyperText Transfer Protocol (HTTP) decoder, a File Transfer Protocol (FTP) decoder, a Network News Transfer Protocol (NNTP) decoder or a Simple Mail Transfer Protocol (SMTP) decoder.

12. The system of claim 9, wherein the network elements comprise at least one of a network host, network peers, and a network port associated with the network traffic.

13. The system of claim 9, wherein the forwarding component further discards the packet flows that are exceptions to the rules.

14. A computer-readable storage medium comprising instructions that cause a programmable processor within a network device to:

receive network traffic flowing between a firewall and one or more computing nodes within a network;

identify packet flows within the network traffic;

process the packet flows to identify the network elements associated with the packet flows;

form application-layer communications from the packet flows;

process the application-layer communications to identify application-layer elements;

analyze the application-layer elements to determine whether each of the packet flows represents a network attack;

based on the determination, forward packets of the packet flows to a destination identified by each of the packets;

generate profiling data to associate the application-layer elements of the application-layer communications with the network elements of the packet flows;

store the profiling data to a correlation database present a user interface by which a user defines a policy violation object that specifies a set of rules for a network, wherein each of the rules specifies network elements and application-layer elements to define permissible traffic characteristics for packet flows expected to be within a network, wherein the rules represent the policies expected to be implemented by the firewall;

query the correlation database storing the profiling data to identify any packet flows within the network traffic output from the firewall that satisfy none of the rules; and producing a report listing the identified packet flows that are not expected to be present within the network based on the application of the policy violation object to the profiling data generated by the IDP device.

* * * * *